Figure 1:
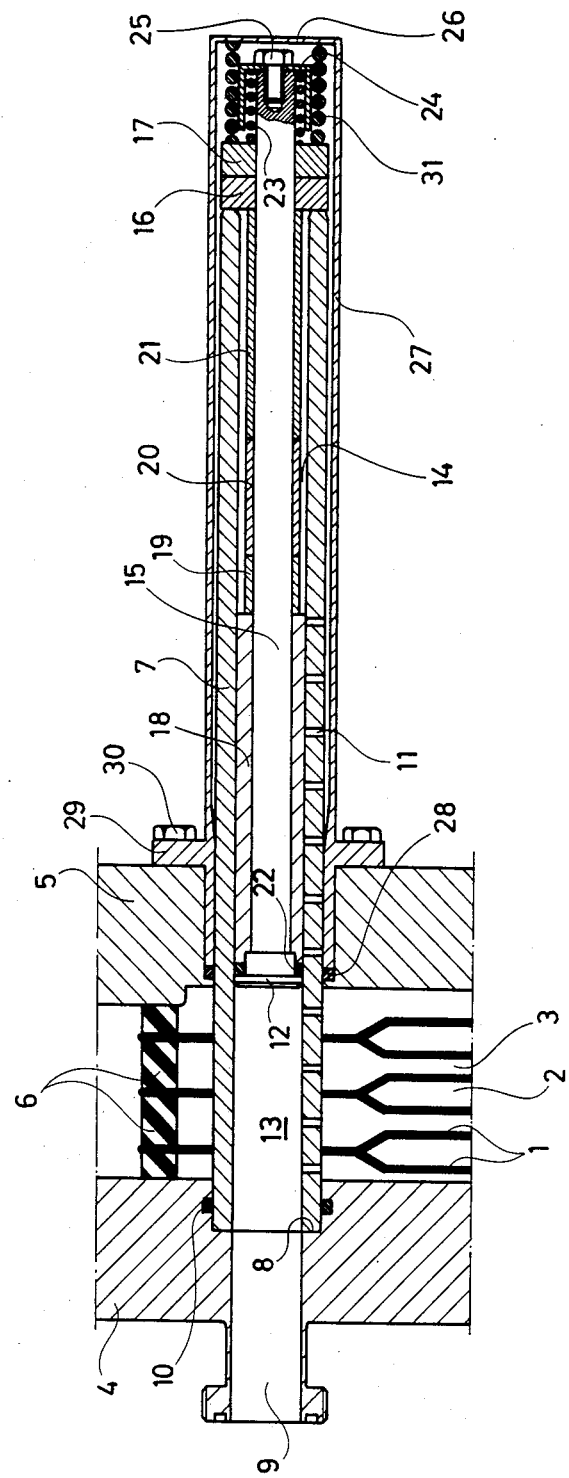

United States Patent [19]

Bolmstedt et al.

[11] Patent Number: 4,696,341
[45] Date of Patent: Sep. 29, 1987

[54] DEVICE FOR CHANGING THE NUMBER OF PART STREAMS OF A FLOWING MEDIUM

[75] Inventors: Ulf Bolmstedt, Staffanstorp; Björn-Olow Johansson, Lomma, both of Sweden

[73] Assignee: Alfa-Laval Food and Dairy Engineering AB, Tumba, Sweden

[21] Appl. No.: 12,130
[22] PCT Filed: May 14, 1986
[86] PCT No.: PCT/SE86/00224
§ 371 Date: Jan. 7, 1987
§ 102(e) Date: Jan. 7, 1987
[87] PCT Pub. No.: WO86/07418
PCT Pub. Date: Dec. 18, 1986

[30] Foreign Application Priority Data

Jun. 11, 1985 [SE] Sweden .................. 8502875

[51] Int. Cl.$^4$ ............................... F28F 7/02
[52] U.S. Cl. ..................... 165/101; 165/153; 165/166
[58] Field of Search ............. 165/101, 153, 166, 167

[56] References Cited

U.S. PATENT DOCUMENTS

| | | | |
|---|---|---|---|
| 403,936 | 5/1889 | Halsey | 165/101 |
| 3,047,274 | 7/1962 | Wilson | 165/101 X |
| 3,150,028 | 9/1964 | Wennerberg | 165/167 X |
| 3,976,128 | 8/1976 | Patel et al. | 165/153 |
| 4,162,703 | 7/1979 | Bosaeus | 165/167 |

Primary Examiner—Albert W. Davis, Jr.
Assistant Examiner—Richard R. Cole
Attorney, Agent, or Firm—Davis Hoxie Faithfull & Hapgood

[57] ABSTRACT

A device for changing the number of part streams of a flowing medium comprises a tube (7) with a plurality of holes (11) through the tube wall and a piston (12) displaceable in the tube (7). By means of said piston (12) the interior of the tube can be divided such that a desirable number of holes (11) communicate with a first compartment (13) in the tube intended to be throughflowed by a medium. Through a second compartment (14) in the tube there is extending a piston rod (15) connected with the piston (12). For the change of the number of holes (7) communicating with said first compartment (13), at least one of a determined number of sleeve members (19-21), which are removably applied around the piston rod (15), is arranged to change place on the piston rod between a position within the tube (7) and a position axially outside the tube (7). In the latter position the member is placed between a first stop member (16), which abuts against an end surface of the tube (7), and a second stop member (17), which is arranged to keep the first stop member (16) axially pressed against said end surface. The remaining sleeve members are the same time clamped between the piston (12) and the first stop member (16). The device may be utilized, for instance, at the inlet of a plate evaporator.

4 Claims, 2 Drawing Figures

DEVICE FOR CHANGING THE NUMBER OF PART STREAMS OF A FLOWING MEDIUM

The present invention relates to a device for changing the number of part streams of a flowing medium, comprising a tube with a plurality of holes through the tube wall arranged one after the other in the length direction of the tube, a piston, which divides the interior of the tube into a first compartment, through which the medium is intended to flow, and a second compartment, which is closed from the first compartment, and a piston rod, which extends from the piston through the second compartment and with an end portion extends a distance outside the tube, the number of part streams being determined by the number of holes through the tube wall communicating with the first compartment.

In a device of this kind it is desirable to be able to fix the piston in a simple way in different precise positions along the tube without any need of providing the device with auxiliary components, and without getting any components left over after an accomplished change.

The object of the present invention is to provide a device for changing the number of part streams of a flowing medium, which fulfils this desire and also has a simple and unexpensive design. All parts of the device shall be required for the fixation of the piston in its different positions along the tube.

This object can be obtained by a device of the kind initially mentioned, which according to the invention is provided with:

a first stop member, which is arranged axially displaceable on the end portion of the piston rod extending out from the tube and which is adapted to abut against an end surface of the tube, a second stop member, which is arranged to keep the first stop member axially pressed against said end surface of the tube, and a determined number of sleeve members with different axial extension, which are removably applied one after the other around the piston rod within the tube and which together have such an axial extension that they serve as spacing means between the piston and said first stop member, when the latter is pressed against said end surface of the tube by the second stop member, a change of the number of part streams being possible by at least one of the sleeve members being movable to and clampable as a spacing means in a position between the two stop members, and the remaining sleeve members being clampable between the piston and the first stop member.

A device of this kind has the advantage that all the sleeve members have to be in place in order that the device will function, regardless of the number of part streams determined by the position of the piston relative to the tube. Even if the device comprises a great number of sleeve members, there is thus no risk that any of them could get lost.

According to a preferred embodiment of the invention a first compression spring is disposed between the second stop member and a third stdp member, which is releasably connected to the end of the piston rod. By this, an annular gasket can be placed between the piston and the sleeve member situated next to the piston, which annular gasket under the action of the force from the first compression spring is radially expandable to sealing between the piston and the tube. Accordingly, the annular gasket should be dimensioned such that in an unexpanded state it will not counteract a relative displacement between the piston and the tube. By this, it is also avoided that the annular gasket would be damaged when passing the tube holes, since in its unexpanded state it can not penetrate into these holes.

The said first compression spring guarantees that the annular gasket slways will be expanded to seal satisfactorily between the piston and the tube, no matter if the annular gasket after a time of use is permanently deformed or has changed in dimension because of ageing for instance.

In a special application of the invention the tube extends through aligned holes in heat exchange plates, which are releasably held together between a first and a second frame plate. Then the tube holes, which coamunicate with said first compartment of the tube interior, are situated opposite to every second passage between the heat exchange plates. The end of the tube nearest the first compartment abuts against a shoulder, which surrounds a flow channel for the medium through the first frame plate and which is united with the latter. Further, a capsule provided with an end wall is telescopically applied on a portion of the tube extending through and out of a hole in the second frame plate, and is releasably connected with the last said frame plate, a second compression spring being disposed between the end wall of the capsule and the second stop member.

The number of heat exchange plates may easily be increased or decreased, sine a required corresponding change of the number of holes communicating with the first compartment of the tube interior is easy to accomplish. Hereby, it will be possible in an easy way to change the capacity of a heat exchnger, for instance a plate evaporator, by means of a device according to the invention.

In a plate evaporator the device according to the invention may be utilized as an inlet device for a liquid to be evaporated, which liquid can then flow through a channel in one of the frame plates into the first compartment of the tube interior.

From there, the evaporation liquid can be conducted into every second passage between the heat exchange plates for heat exchanging with a heating medium, for instance steam, flowing in the remaining passages between the heat exchange plates.

The device according to the invention naturally may be utilized irrespective of the flow direction through the holes in the perforated tube.

The invention will be explained more closely in the following with reference to the accompanying drawing. In this FIG. 1 shows a section through the upper part of a plate evaporator provided with a device according to the invention, which is adjusted for four part streams.

Figure 2:
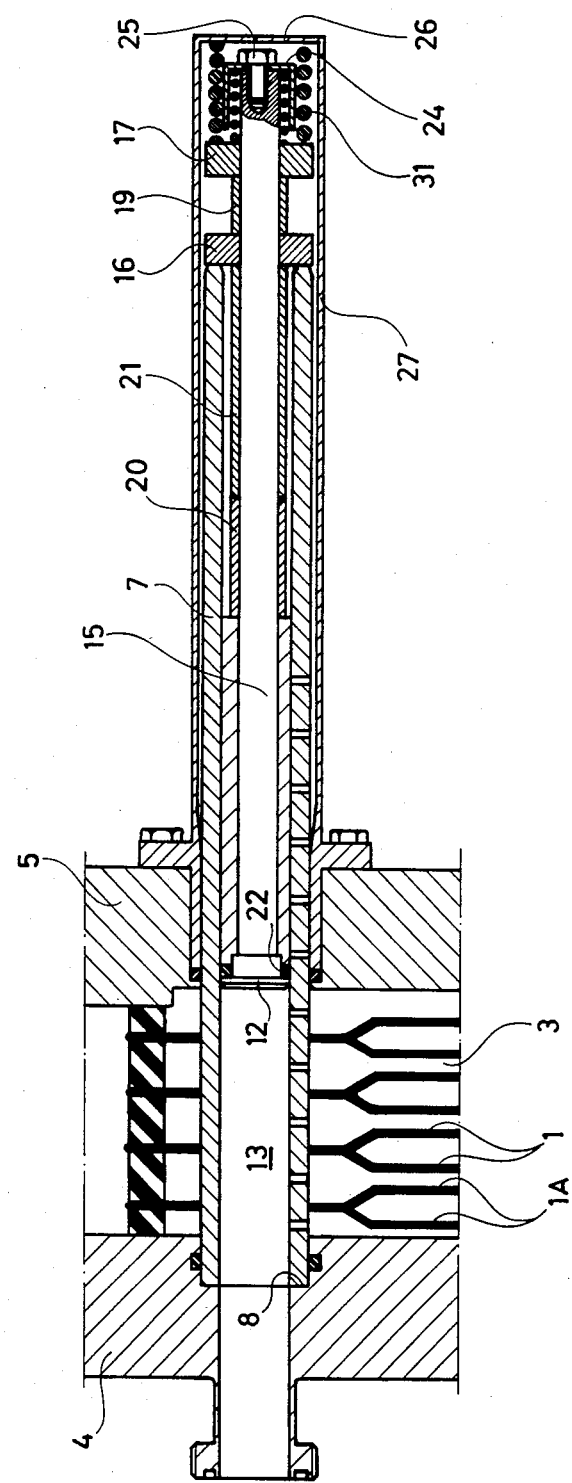

FIG. 2 shows a corresponding section through the plate evaporator with the device adjusted for five part streams.

The plate evaporator shown in FIG. 1 comprises three pairs of heat exchange plates. Each plate pair 1 defines a plate interspace 2 constituting a passage for through-flowing of a heating medium, for instance steam, while the spaces 3 between the plate pairs constitute evaporation passages intended to be through-flowed by liquid to be evaporated. A first and a second frame plate 4 and 5, respectively, keep the plate pairs 1 together, which seal against each other around their edges by means of gaskets 6, so that sealed interspaces are formed. The frame plates 4, 5 as well as the plate pairs have aligned through-holes. A tube 7 is inserted through the holes of the plate pairs via the hole in the second frame plate 5 and, further, a distance into the hole through the first frame plate 4, where it abuts against a shoulder 8, which surrounds a flow channel 9 through the first frame plate 4 for incoming evaporation liquid. An annular gasket 10 is arranged at the end portion of the tube 7 to seal between the tube 7 and the first frame plate 4. The tube 7 has eleven holes 11, four of which being situated opposite to respective evaporator passages 3.

Within the tube 7 there is arranged a piston 12, which divides the interior of the tube into a first compartment 13, through which evaporation liquid is intended to flow to and through the said four holes 11, and a second compartment 14, which is closed from the first compartment 13. A piston rod 15 extends from the piston 12 through the second compartment and extends with an end portion a distance outside the tube 7. A first stop member 16 is arranged axially displaceable on the end portion of the piston rod 15 protruding from the tube 7 and abuts against an end surface of the tube 7. A second stop member 17 is also arranged displaceable on the piston rod 15, and abuts against the first stop member 16 between this and the end of the piston rod. Four sleeve members 18–21 of different axial extension are removably applied one after the other on the piston rod 15 within the tube 7. The sleeve members 18–21 together have such an axial extension that they serve as spacing means between the piston 12 and the first stop member 16. The sleeve member 18 situated next to the piston 12 has one of its ends abutting against the piston via an annular gasket 22. The remaining three sleeve members 19–21 have axial lengths corresponding to multiples of the distance between adjacent tube holes 11, which are situated with the same mutual distance along the tube 7 (with the exception of the two first holes counted from the left in the drawing). Thus, the second sleeve member 19 counted from the piston 12 has an axial length corresponding to the distance between two adjacent tube holes 11, the third member 20 has a length of twice said distance, and the fourth member 21 has a length of four times said distance. The stop members 16, 17 are pressed against the sleeve member 21 and the piston 12 by means of a first compression spring 23 arranged around the piston rod 15 and abutting against a third stop member 24. The latter is removably connected to the end of the piston rod by means of a screw 25 and is formed like an end sleeve surrounding the compression spring 23.

The device further comprises a capsule 27 with an end wall 26 telescopically applied on a portion of the tube 7, which protrudes from the through-hole of the frame plate 5. The capsule 27 is inserted a distance into said hole to abutment against a shoulder, which surrounds the hole, via a gasket 28. Near its open end the capsule 27 has a flange 29, which is releasably connected with the frame plate 5 by means of screws 30. The gasket 28 is radially expanded to seal between the frame plate 5 and the tube 7. Another compression spring 31 is arranged within the capsule 27 between its end wall 26 and the second stop member 17. The tube 7 is pressed by the action of the compression spring 31 via the stop members 16, 17 against the shoulder 8, which surrounds the flow channel 9 through the frame plate 4.

With reference to the FIGS. 1 and 2, it will be described in the following the procedure when the plate evaporator is to be enlarged with a pair of heat exchange plates, i.e. with an evaporation passage.

First the capsule 27 is released from the frame plate 5, whereafter it is removed from the tube 7. The compression spring 31 comes along. Then the screw 25 at the end of the piston rod is loosened at least so much that the action of the compression spring 23 ceases, so that the annular gasket 22 at the piston 12 becomes unloaded. Now, it will be possible to withdraw the piston rod 15 from the tube, but the piston rod should only be withdrawn so much that the sleeve members 19–21 become available. The screw 25 at the end of the piston rod is removed, whereafter the end sleeve 24, the compression spring 23, the stop members 16, 17 and the sleeve members 19–21 in said order are removed from the piston rod 15.

The third and the fourth sleeve member 20 and 21, respectively, (counted from the left in FIG. 1) and the first stop member 16 are remounted in said order on the piston rod 15, whereafter the second sleeve member 19, the length of which corresponds to the distance between two adjacent tube holes 11, is applied around the piston rod 15. Then, the second stop member 17, the compression spring 23, the end sleeve 24 and the screw 25 are mounted, the latter being screwed in just that much that the compression spring 23 is still not compressed. The piston rod 15 is then displaced to such a position in the tube 7, that the first stop member 16 abuts against the end surface of the tube. In this position five tube holes 11 communicate with the first compartment 13 of the tube. The screw 25 now is tightened completely, which means that the annular gasket 22 at the piston 12 expands radially to seal between the piston 12 and the tube 7. Then, the frame plate 4 is demounted, and a further pair of heat exchange plates 1A is added to the plate package (see FIG. 2), whereafter the frame plate 4 is remounted.

Alternatively, the second frame plate 5, instead, may be demounted with the device still connected to it. After connection of a further plate pair to the plate package the frame plate 5 is remounted. This alternative way of mounting has the advantage that the conduit for charging evaporation liquid need not be demounted from the frame plate 4.

Now the tube 7 can be displaced through the plate package to abut against the shoulder 8 around the flow channel 9 (the inlet) in the frame plate 4. By this, each of five tube holes 11 will be situated opposite to respective evaporation passage 3. Finally, the capsule 27 with the compression spring 31 is mounted, whereafter the plate evaporator is ready to be used, now with an increased evaporation capacity.

In an analogous way the capacity of the evaporator, concerning the number of plate pairs, may be changed from three to ten plate pairs by combination of the sleeve members 19–21 available in the device, so that each of the tube holes will be situated opposite to an evaporation passage.

In the drawing the tube holes 11 are shown directed downwards. Preferably, they may also be directed upwards for the achievement of a good distribution of the evaporation liquid already in the uppermost part of the plate package. In the tube holes there may be mounted replaceable nozzles, the orifices of which have a chosen size dependent on the kind of liquid to be distributed. If such nozzles have a special design, a good distribution may be obtained even if the tube holes are directed downwards.

The above described plate evaporator is provided with a device according to the invention, by means of which inflowing evaporation liquid is distributed into a number of part streams. It is also conceivable that the device may be used at the outlet of an evaporator to bring part streams of evaporation liquid from the evaporation passages together to a common outlet.

Also other kinds of plate heat exchangers are conceivable for utilization of the device according to the invention.

What is claimed:

1. A device for changing the number of part streams of a flowing medium, comprising a tube (7) with a plurality of holes (11) through the tube wall arranged one after the other in the length direction of the tube, a piston (12), which divides the interior of the tube into a first compartment (13), through which the medium is intended to flow, and a second compartment (14), which is closed from the first compartment (13), and a piston rod (15), which extends from the piston (12) through the second compartment (14) and with an end portion extends a distance outside the tube (7), the number of part streams being determined by the number of holes (11) through the tube wall communicating with the first compartment (13), characterized by a first stop member (16), which is arranged axially displaceable on the end portion of the piston rod (15) extending out from the tube (7) and which is adapted to abut against an end surface of the tube (7), a second stop member (17), which is arranged to keep the first stop member (16) axially pressed against said end surface of the tube, and a determined number of sleeve members (18-21) of different axial extension, which are removably applied one after the other around the piston rod (15) within the tube (7) and which together have such an axial extension that they serve as spacing means between the piston (12) and said first stop member (16), when the latter is pressed against said end surface of the tube by the second stop member (17), a change of the number of part streams being possible by at least one of the sleeve members (19-21) being movable to and clampable as a spacing means in a position between the two stop members (16, 17), and the remaining sleeve members being clampable between the piston (12) and the first stop member (16).

2. A device according to claim 1, characterized in that a first compression spring (23) is disposed between the second stop member (17) and a third stop member (24), which is releasably connected to the end of the piston rod.

3. A device according to claim 2, characterized in that an annular gasket (22) is disposed between the piston (12) and the sleeve member (18) situated next to the piston, which annular gasket (22) by the action of the force from the first compression spring is radially expandable for sealing between the piston (12) and the tube (7).

4. A device according to claim 1 characterized in
   that the tube (7) extends through aligned holes in heat exchange plates (1), which are releasably held together between a first and a second frame plate (4 and 5, respectively),
   that the tube holes (11), which communicate with the said first compartment (13), are situated opposite to every second passage between the heat exchange plates,
   that the end of the tube nearest the first compartment (13) abuts against a shoulder (8), which surrounds a flow channel (9) for the medium through the first frame plate (4) and which is united with the latter, and
   that a capsule (27) formed with an end wall (26) is telescopically applied on a portion of the tube (7), which extends through and out of a hole in the second frame plate (5), and is releasably connected with this frame plate, a second compression spring (37) being disposed between the end wall (26) of the capsule and the second stop member (17).

* * * * *

UNITED STATES PATENT AND TRADEMARK OFFICE
CERTIFICATE OF CORRECTION

PATENT NO. : 4,696,341
DATED : September 29, 1987
INVENTOR(S) : Ulf Bolmstedt et al It is certified that error appears in the above-identified patent and that said Letters Patent is hereby corrected as shown below:

Column 1, line 61, "stdp" should be --stop--.

Column 2, line 16, "coamunicate" should be --communicate--.

Column 2, line 30, "sine" should be --since--.

Signed and Sealed this

Fifteenth Day of March, 1988

Attest:

DONALD J. QUIGG

Attesting Officer

Commissioner of Patents and Trademarks